(12) United States Patent
Klemm

(10) Patent No.: US 11,766,142 B2
(45) Date of Patent: Sep. 26, 2023

(54) APPARATUS AND METHOD FOR THAWING A FROZEN DRINK IN A GLASS DRINKING BOTTLE

(71) Applicant: KUKKI GMBH, Berlin (DE)

(72) Inventor: Josef Klemm, Berlin (DE)

(73) Assignee: KUKKI GMBH, Berlin (DE)

( * ) Notice: Subject to any disclaimer, the term of this patent is extended or adjusted under 35 U.S.C. 154(b) by 794 days.

(21) Appl. No.: 16/477,699

(22) PCT Filed: Jan. 15, 2018

(86) PCT No.: PCT/DE2018/100023
§ 371 (c)(1),
(2) Date: Jul. 12, 2019

(87) PCT Pub. No.: WO2018/130252
PCT Pub. Date: Jul. 19, 2018

(65) Prior Publication Data
US 2019/0357709 A1    Nov. 28, 2019

(30) Foreign Application Priority Data
Jan. 13, 2017    (DE) ..................... 10 2017 100 647.8

(51) Int. Cl.
*A47G 19/22*    (2006.01)
*A47J 36/24*    (2006.01)
*F25D 31/00*    (2006.01)

(52) U.S. Cl.
CPC ...... *A47G 19/2288* (2013.01); *A47J 36/2433* (2013.01); *A47G 2200/166* (2013.01);
(Continued)

(58) Field of Classification Search
CPC .......... A47G 19/2288; A47G 2200/166; A47J 36/2433; A61J 2200/42; F25D 31/005; F25D 31/007
See application file for complete search history.

(56) References Cited

U.S. PATENT DOCUMENTS 5,248,870 A * 9/1993 Redal ..................... H05B 3/009
                                                              211/74
5,966,961 A  10/1999 Ziggiotto
(Continued)

FOREIGN PATENT DOCUMENTS

DE         704788 C     4/1941
DE       3010889 A1    10/1981
(Continued)

OTHER PUBLICATIONS

International Preliminary Report on Patentability regarding PCT/DE2018/100023, including English translation of the Written Opinion, dated Jul. 25, 2019.
(Continued)

*Primary Examiner* — Elizabeth J Martin
(74) *Attorney, Agent, or Firm* — Harness, Dickey & Pierce, P.L.C.

(57) ABSTRACT

An apparatus is presented for thawing a frozen drink in a glass bottle. The apparatus includes: a housing with a bottle receiving space arranged therein and designed to accommodate a glass drinking bottle; a heating device that is arranged in the housing and has radiative heat sources that are arranged around the bottle receiving space in order to radiate heat energy onto the glass drinking bottle, and a thermal insulation and cooling device which is arranged in the housing. The thermal insulation and cooling device has a thermally insulating space which is formed between the radiative heat sources and an outer housing wall, so as to encompass the outer housing wall. An air cooling system draws air from the surroundings into the housing via an air intake and conveys the air via an air guide to an air outlet, where the air guide encompasses the thermally insulating space.

14 Claims, 19 Drawing Sheets

(52) U.S. Cl.
CPC ......... *A61J 2200/42* (2013.01); *F25D 31/005* (2013.01); *F25D 31/007* (2013.01)

(56) References Cited

U.S. PATENT DOCUMENTS

| | | | |
|---|---|---|---|
| 7,089,749 | B1 | 8/2006 | Schafer |
| 2004/0140304 | A1* | 7/2004 | Leyendecker ...... A47J 36/2433 219/521 |
| 2005/0045617 | A1 | 3/2005 | Taylor |
| 2005/0072771 | A1* | 4/2005 | Suzuki ................ A47J 36/2433 219/441 |
| 2006/0188418 | A1 | 8/2006 | Park et al. |
| 2011/0147374 | A1* | 6/2011 | Obst .................... H05B 3/0076 219/647 |
| 2012/0064470 | A1 | 3/2012 | Delattre et al. |
| 2016/0242598 | A1 | 8/2016 | Alexander |

FOREIGN PATENT DOCUMENTS

| | | |
|---|---|---|
| GB | 814808 A | 6/1959 |
| JP | S61157428 U | 9/1986 |
| JP | H0373111 A | 3/1991 |
| JP | H0373112 A | 3/1991 |
| JP | H0386113 A | 4/1991 |
| JP | H0611231 A | 1/1994 |
| WO | WO-2011/042698 A2 | 4/2011 |

OTHER PUBLICATIONS

International Search Report (English and German) issued in International Application No. PCT/DE2018/100023, mailed Apr. 9, 2018; ISA/EP.

\* cited by examiner

APPARATUS AND METHOD FOR THAWING A FROZEN DRINK IN A GLASS DRINKING BOTTLE

CROSS-REFERENCE TO RELATED APPLICATIONS

This application is a 371 U.S. National Stage of International Application No. PCT/DE2018/100023, filed Jan. 15, 2018, which claims priority to German Patent Application No. DE 10 2017 100 647.8, filed Jan. 13, 2017. The entire disclosures of the above applications are incorporated herein by reference.

The invention relates to an apparatus and a method for thawing a frozen drink in a glass drinking bottle.

BACKGROUND

Apparatuses are known using which a frozen good can be thawed. These include microwave devices for example.

A device for heating liquids by means of electrical or non-electrical heating apparatuses is known from the document DE 704 788 A, the heating energy of which is transferred by means of thermal radiation to the liquid to be heated.

SUMMARY

It is the object of the invention to specify an apparatus and a method for thawing a frozen drink in a glass drinking bottle.

To achieve the object, an apparatus and a method for thawing a frozen drink in a glass drinking bottle according to the independent claims 1 and 13 are created. Alternative configurations are the subject matter of dependent subclaims.

According to one aspect, an apparatus is created for thawing a frozen drink in a glass drinking bottle. The apparatus has a housing, in which a bottle accommodation space is arranged. The bottle accommodation space is set up to accommodate a glass bottle with a frozen drink for thawing. A heating device is provided, which is arranged in the housing and has heat radiators which are arranged around the bottle accommodation space in order to radiate thermal energy onto the glass drinking bottle during thawing operation. The apparatus has a thermal insulating and cooling device, which is arranged in the housing. The thermal insulating and cooling device has a thermally insulating space and an air cooling. The thermally insulating space is constructed in the housing between the heat radiators and an outer housing wall and circumferentially encompassing the outer housing wall. During the air cooling, cooling air is drawn into the housing from the surroundings via an air intake by means of an air conveying device and conducted in the housing via an air duct to an air outlet, wherein the air duct is constructed encompassing at least the thermally insulating space.

According to a further aspect, a method for thawing a frozen drink in a glass drinking bottle is specified, in which an apparatus of this type is provided. A glass drinking bottle is arranged in a bottle accommodation space in a housing of the apparatus, and the frozen drink in the glass drinking bottle is thawed.

The heating device may be set up to provide a heating output of between approximately 1 kW and approximately 4 kW, alternatively between approximately 2 kW and approximately 3 kW.

It may be provided that a space between the heat radiators and the glass drinking bottle, if the glass drinking bottle is arranged in the bottle accommodation space, is empty, so that direct radiation or irradiation of the thermal energy from the heat radiators onto the glass drinking bottle is enabled. The glass drinking bottle can be heated in the bottle accommodation space free from heat conduction due to tactile contact, thus, for example, solely on the basis of introduction of thermal energy by means of thermal radiation.

The air intake can be constructed in the base region of the housing and/or adjacent thereto, for example with one or more openings in the outer housing wall. The air outlet can be constructed in an upper part of the housing in the top region and/or adjacent thereto, for example by means of one or more openings in the housing wall.

The air conveying device for drawing and for conveying the drawn air in the air duct may comprise one or more fans.

An opening for inserting the glass drinking bottle into the bottle accommodation space can be constructed on the housing at the top side.

The heat radiators can be surrounded by an inner wall, and the thermally insulating space can be arranged between the inner wall and the outer housing wall. The inner wall surrounding the heat radiators, which is arranged between the outer housing wall and the heat radiators, can be realized in a circumferentially continuous or interrupted manner. The outer housing wall and/or the inner wall may consist of metal or metallized glass (plate glass). A single- or a multi-part design may be provided. In this or other embodiments, the housing may have a round or a polygonal cross-sectional area.

The thermally insulating space may be filled at least partially with thermally insulating material. Glass, stone and/or mineral wool can for example be used as temperature-resistant thermal insulation materials.

It may be provided that the cooling air flows through the thermally insulating material during conduction along the air duct.

The air duct can be constructed to encompass electrical contact or connection regions of the heat radiators. In this embodiment, the cooling air flows over or around the electrical contact or connection regions of the heat radiators and thus cools the same. For example, sockets, for example lamp sockets, of the heat radiators can be cooled in this manner. The electrical contact or connection regions can be arranged at least partially outside the bottle accommodation space. This may for example be constructed by means of one or more wall sections arranged in the housing. A spatial separation of this type can be produced using one or more horizontally running wall sections. A lower horizontal wall section can in one embodiment provide a standing surface for the glass drinking bottle at the same time here, if the glass drinking bottle is arranged in the bottle accommodation space. In this or other embodiments, the lower horizontal wall section can separate a part of the inner space in the housing, in which functional components of the apparatus are arranged, for example one or more fans and/or circuit elements, for example circuit elements of a control device and/or the heating device.

The air duct can be constructed encompassing a standing surface, on which the glass drinking bottle can stand if the glass drinking bottle is arranged in the bottle accommodation space. In this design, the air duct runs along the standing surface, particularly on an under-side of the standing surface, on which the glass drinking bottle stands if the glass drinking bottle is arranged in the bottle accommodation space.

The heating device can have an arrangement of bar heat radiators which are arranged around the bottle accommodation space. A plurality of heating rods, which in each case emit thermal radiation during thawing operation, can be provided around the bottle accommodation space. The heat radiators can emit the radiation in the infrared range. Halogen infrared lighting rods or lamps, in which a glowing wire is arranged in a glass housing filled with halogen gas, are suitable for this for example. The halogen gas protects the heating wire radiating the thermal energy from oxygen-containing atmosphere. This increases the lifespan of the radiators. Different infrared light wavelengths, such as 0.98 μm, 1.2 μm or 1.6 μm for example, can be used for various application cases. Depending on the good to be thawed, the wavelengths can be adapted to the drink. A combination of a plurality of wavelengths is also possible.

One or more reflectors can be provided at the heat radiators, which radiators direct the radiation onto the drink to be thawed. As a result, the effectiveness and the efficiency of the thawing process can be increased. Alternatively or additionally, the reflectors can be arranged outside the heat radiators. They can influence the radiation behaviour in such a manner that the glass drinking bottle is irradiated with optimum energy distribution for the thawing process. Mirror materials made from glass and/or metal (metallized glass or metal), as well as ceramic coatings applied onto the glass, are suitable for this for example. The shape of the reflector(s) may be parabolic, and the heat radiators may be arranged at the focal point in each case, in order to enable a parallel homogeneous radiation towards the glass drinking bottle. The radiation can be focused or widened towards the glass drinking bottle by means of an elliptical reflector.

A grip protector can be arranged in the housing at a housing opening, by means of which the glass drinking bottle can be introduced into the bottle accommodation space. The grip protector protects the user from inadvertently coming with the fingers too close to or even into tactile contact with the heat radiators when inserting or when removing the glass drinking bottle. For this purpose, the grip protector may extend from the housing opening at least by a finger length into the housing interior. A wall section of the grip protector may extend in the vertical direction downwards from the housing opening and may be formed in a circumferentially continuous manner around the housing opening. In one embodiment, the grip protector is produced from a glass material.

Glass drinking bottles with transparent plastic labels may be used. In order to prevent melting of the plastic labels in particular, particularly on hot metal, it may be provided to form a guide and centring, which may be provided for the glass drinking bottle in the heating space and which for example has guide rods and which is made from transparent non-metallic materials, for example glass or ceramic materials, for example from fused silica or borosilicate glass. The material which is transparent for infrared hardly absorbs energy and consequently is heated up less strongly than metallic materials. Optionally, the elements of the guide, for example the guide rods, may consist of a glass tube and additionally, connected to the cooling system, be cooled from the inside by air.

The heating device can couple to a control device, which is set up to control an operation of the heating device. With the aid of the control device, the heating device can be operated in different operating modes during thawing operation. For example, it may be provided that operating modes differ by means of the heating output emitted in the respective operating mode. A fixed sequence of various operating modes may be executed as thawing program, in that the control device controls this. Furthermore, the control device may be set up to control the heating device for implementing safety measures.

A sensor device may couple to the control device, which sensor device is set up to detect whether the glass drinking bottle is arranged in the bottle accommodation space. The sensor device may be a mechanical sensor device, for example a tactile sensor. A contact sensor may additionally or alternatively be provided. A mechanical sensor device having a pushbutton or a micro-switch may be provided, as it may offer more safety in combination with a spring mechanism. The additional spring device may increase the force in order to trigger a switch mechanism. An empty glass drinking bottle does not switch the heating device on. Only a full glass drinking bottle can do that. Thawing does not take place below a certain minimum weight. This secures the apparatus against switching on autonomously without human assistance, if a leaf from a tree falls into the opening of the apparatus, for example.

The sensor device can be arranged in the base region of the housing, for example in the region of the standing surface, on which the glass drinking bottle is arranged when it is located in the bottle accommodation space for thawing. The switching on and/or off of the heating device can be controlled as a function of a signals, which can be detected using the sensor device. Thus, the heating device can be switched on automatically if the sensor device detects that a glass drinking bottle is arranged in the bottle accommodation space. A similar control for switching off can be provided if it is detected that a glass drinking bottle, which was previously in the bottle accommodation space, is removed. It may be provided that switching on of the heating device is blocked by means of the control device as long as the sensor device does not indicate that a glass drinking bottle is arranged in the bottle accommodation space.

The control device can be set up to block switching on of the heating device if the control device detects that the sensor device indicates for a time period, which is shorter than a threshold time period, that no glass drinking bottle is arranged in the bottle accommodation space. In this embodiment, the control device can monitor the time period for which the sensor device indicates that there is no glass drinking bottle arranged in the bottle accommodation space. For example, this may prevent the heating device from being switched on if a glass drinking bottle located in the bottle accommodation space is only briefly lifted and subsequently put down again. This prevents a previously thawed drink from being loaded with thermal energy anew, which may lead to undesired heating of the drink. The control device monitors a minimum time period which must elapse until the switching on of the heating device is allowed again. The control device can be set up to prevent a glass drinking bottle forgotten in the apparatus from inadvertently being thawed multiple times. In order to start the thawing process, the glass drinking bottle must be removed from the apparatus or lifted for a certain time. The control device can switch off the power supply again after a maximum switch-on time. This protects against overheating.

The control device can couple to a detection device, which is set up to detect the frozen drink in such a manner that the control device controls the heating device during operation as a function of the detection of the frozen drink. The detection device can for example be set up to determine whether the frozen drink is still frozen through or already partially thawed. Depending on this, different heating outputs can be controlled by the control device for the thawing operation. Contactless infrared thermometers, which can derive the body temperature from the incident infrared radiation, are suitable for this for example. A sensor may be provided, which "sees" from below through the base of the bottle into the bottle. This has the advantage that even during heating operation, the temperature in the drink can be monitored without the heat radiators radiating from the side dazzling or negatively influencing the sensor. Depending on the body temperature of the drink, the heating output and the heating duration can thus be adapted to the thawing object. Various bottle sizes (masses) and temperatures can readily be thawed with constant quality. In the sense used here, constant quality means for example that the ice cubes which are optionally located in the glass drinking bottle after thawing can move freely in the bottle. Too much heat would also melt the ice cubes in the bottle. In this example, only the liquid should be thawed, the water ice should remain solid.

A further protective device, which can be implemented in connection with the control device, can switch off the power electronics in the event of a breakage of the glass drinking bottle in the apparatus or if it starts to rain, before the liquid runs down into the electronics and can trigger dangerous short circuits. To this end, a sensor may be placed below the base of the bottle by means of a circuit board. The sensor may have gold-plated conductor track sections, which have different voltage potentials, intertwining like two combs, in the low-voltage range, which is not dangerous for humans. Due to their good properties with regards to corrosion and oxidation, the gold-plated surfaces of the combs ensure that the surface always remains electrically conductive. However, different metallic materials are also suitable for the combs. Escaping liquid flies downwards due to gravity and triggers a short circuit between the combs by means of contact with the sensor. The combs are connected to one another at one or more points by means of the electrically conductive liquid. As the liquid runs over the sensor first, the switch off takes place very rapidly. In a suitable optimization, it can therefore be ensured that the power supply is switched off before the liquid reaches fans and critical regions of the electronics. The short circuit is detected by means of an electronic control device and leads to the switching off of the power electronics, for example by means of relays. Alternatively, the short circuit may also be used in order to allow the supply voltage of the relays to break down, which is accompanied by switching off of the relays. Care must be taken here, that the apparatus which supplies the low supply voltage for the combs and the relays is also short-circuit resistant/proof.

A further temperature sensor may monitor the interior in the cooling system and thus detect disruptions in the cooling system due to clogging or defective fans or blocked air inlets and switch off the entire machine prior to overheating. If the temperature in the interior of the cooling system or in the region of the electronics increases beyond a defined limit value, for example 40° C., an emergency switch off can take place.

The apparatus may have detection of zero crossing to improve the EMC properties, specifically to avoid EMC loads which are damaging for the mains and for the device, and to prevent flickering effects when dimming the power. A detection system can detect each individual zero crossing of the 50 Hz AC mains and thus deliver ideal control points for controlling the dimmer. If dimmers are switched on and off at zero crossing, disruption occurring with regards to the EMC can be minimized. The detection of zero crossings additionally entails the great advantage that flickering effects can be avoided or reduced considerably. The flickering effects can be traced back to phase shifts and non-mains-synchronous switching of dimmers, which switch at zero crossing. Thus, it may come to pass that every n switching procedures, the correct switching time is missed and the half-wave was erroneously not switched through. This effect can be seen with a substantially lower frequency of a few Hz and is therefore particularly disturbing.

The apparatus may have a temperature fuse, which permanently interrupts the power supply, as further protection against overheating. If the temperature of the interior climbs above a threshold value, the temperature fuse is triggered permanently.

A safety feature may be provided in the form of a forced disconnection of the mains cable, which makes it necessary to disconnect the mains cable when unmounting the housing. The cover of the housing may have a cutout, which makes it necessary to pull out the mains cable, in order to be able to remove the housing in the only possible unmounting direction. The mains cable in the female connector may mechanically block the unmounting of the cover of the housing.

The apparatus may have a system for adjusting the heating output in the event of a cold start of the apparatus (with cold heat radiators) to prevent mains overloads. An (additional) dimmer can prevent overloading of the power network during a cold start. The electrical resistance of the heat radiators is temperature-dependent and lower in the cold state than in the warm state. In the cold state, all heat radiators are more conductive than during continuous operation in the warm state, which is why an impermissibly high initial current can flow, which may briefly overload the power network. Even after a few fractions of a second, the heat radiators heat up and the heating output decreases considerably. The more heat radiators are operated simultaneously, the more pronounced the influence on the power network becomes. Directly after the switch-on procedure, the dimmer ensures a considerably reduced output by dimming the heating output. This may take place for example by means of a semiconductor relay, which is periodically switched on and off, so that on temporal average, less energy flows and thus the average of the output is reduced considerably. The semiconductor relay can be connected to a heat sink for cooling, which heat sink is ventilated by the air conveying device. After a short time (for example one second), the output can be increased to the standard level, as the heat radiators have been sufficiently heated. The duration of the warm-up phase depends on factors such as the percentage share of the reduced output (dimming) and the conductances of the heat radiators in the cold state, and must be adapted once to the heat radiators used. Alternatively to the use of a dimmer, a temporally offset switch-on of the heat radiators can also be carried out.

The apparatus may have a system for adapting the heating output in the event of the overheating of the apparatus to avoid forced cooling phases. The heating output can be varied during operation by means of a dimmer, for example the semiconductor relay. Due to periodic switching on and off, little energy flows on temporal average, which is why the average of the output can be reduced considerably. This may be provided, if during continuous operation, the power loss can no longer be dissipated sufficiently rapidly by means of the fan. In order to avoid a cooling phase in the event of critical temperatures being exceeded, the heating output can be reduced already in advance, and the apparatus can be used permanently and continuously without waiting periods.

A software-based control of the heating output may be provided, which detects the temperatures in the interior of the housing. If the temperature in the interior of the housing exceeds one or more threshold values, the heating output can be reduced. The control detects the amount of energy already supplied by means of integration of the supplied heating output over time as a function of the number of defective heat radiators and the dimming factor δ. The supplied energy can be calculated according to the following formula $$E = \int_0^{t_e} (P_W \times n_W \times \delta(\Delta\vartheta) - P_V(\Delta\vartheta)) \times dt \qquad (1)$$

Here, E is the amount of energy supplied to the drink, $P_W$ is the output per heat radiator, $t_e$ is the thawing time, $n_W$ is the number of functioning heat radiators, the dimming factor δ is the output adjustment of the dimmer in percent of the maximum output, $E_{-18° C.}$ is the required amount of energy, in order to thaw a deep-frozen drink from −18° C. to the temperature for consumption, $P_V$ is the power loss due to thermal losses due to waste heat in the housing and Δϑ is the temperature difference between the ambient temperature and temperature in the interior of the apparatus.

The operating temperature of the interior of the housing can be detected using a temperature sensor. The ambient temperature of the apparatus can likewise be detected by means of a further temperature sensor. The position of the sensor for the ambient temperature may be in the lower part of the housing, for example close to a bottom plate.

The danger of a short circuit can be reduced with the aid of a water drainage system. The water drainage system may have a temperature-resistant tank (for example made from aluminium) with a drainage opening and optionally for accommodating all important components such as the glass tubes or rods. The water drainage system safely conducts all of the water appearing in the tank out of the housing via the drainage opening through a drainage line, which is formed by means of a hose or a pipe for example.

A channel may be provided, which is set up to collect water, for example excess water outside of the tank. The channel may consist of an electrically non-conductive temperature-resistant material (for example polytetrafluoroethylene, PTFE). The channel may additionally form a centring device by means of centring openings for the socket of the heat radiators. The material of the channel is electrically non-conductive, so that water, which appears at the sockets of the heat radiators cannot cause a short circuit with conductive parts of the housing. The sockets of the heat radiators may be produced from a porous ceramic, which becomes saturated with water and becomes electrically conductive as a result. The sockets of the heat radiators may become very hot during operation, which is why the materials used are sufficiently temperature-resistant. Therefore, for electrically insulating parts, for example, ceramic materials such as for example aluminium titanate, aluminium oxide, zirconium oxide, silicon nitride, aluminium silicate or high-temperature-resistant technical plastics such as polytetrafluoroethylene (PTFE), polyetheretherketone (PEEK), polyetherketone (PEK), perfluoroalkoxy polymers (PFA), polyvinylidene fluoride (PVDF), polyethersulphone (PES), polysulphone (PSU), polyamideimide (PAI), polyimide (PI) or polyphenylene sulphone (PPSU), are used. For electrically conductive components, various metallic alloys, such as for example high-grade steel 1.4301 or aluminium EN AW-2007, may be used.

The channel may have additional defined drainage points, in order to allow any water which is conveyed to only drain at defined points.

Spring contact pins may electrically contact the heat radiators after the introduction thereof at both ends of the respective heat radiator. They may be set up to compensate by means of their flexible extensibility for possible manufacturing tolerances and change in length owing to the extension of the heat radiators during operation.

The apparatus can be easily unmounted and also remounted by means of pluggable electrical connections. Thus, the heat radiators or other components can be exchanged easily. The apparatus can be completely mounted and unmounted using simple, inexpensive and universally available tools (for example: a cruciform screwdriver, a screwdriver and combination pliers).

The heat radiators can in each case be protected from twisting with the aid of a temperature-resistant guide, for example a metal guide.

It is possible to detect whether a connected heat radiator is defective by means of a respective electronic circuit. The missing heating output due to defective heat radiators can be determined by means of a control algorithm and compensated with the aid of a longer heating time. The control algorithm can be set up in such a manner that the thermal energy supplied overall by the non-defective heat radiators remains constant, independently of the number of defective heat radiators, as long as a defined number of defective heat radiators is not exceeded. An acoustic sound signal can signal a defect of a heat radiator. A display can indicate the position of the defective heat radiators to the user. If a defined number of defective heat radiators is exceeded, the operation of the apparatus can be adjusted and a notification about required maintenance can be displayed on the display.

DESCRIPTION OF EXEMPLARY EMBODIMENTS

Further exemplary embodiments are explained in more detail in the following with reference to figures of a drawing. In the figures.

Exemplary embodiments for an apparatus 1 for thawing a frozen drink in a glass drinking bottle 2 are explained in the following, with reference to FIGS. 1 to 19. The same reference numbers are used for the same features in FIGS. 1 to 19. The glass drinking bottle 2 may be a commercially available drinking bottle made from glass, which is for example closed using a disposable closure, for example a crown cork.

Figure 1:
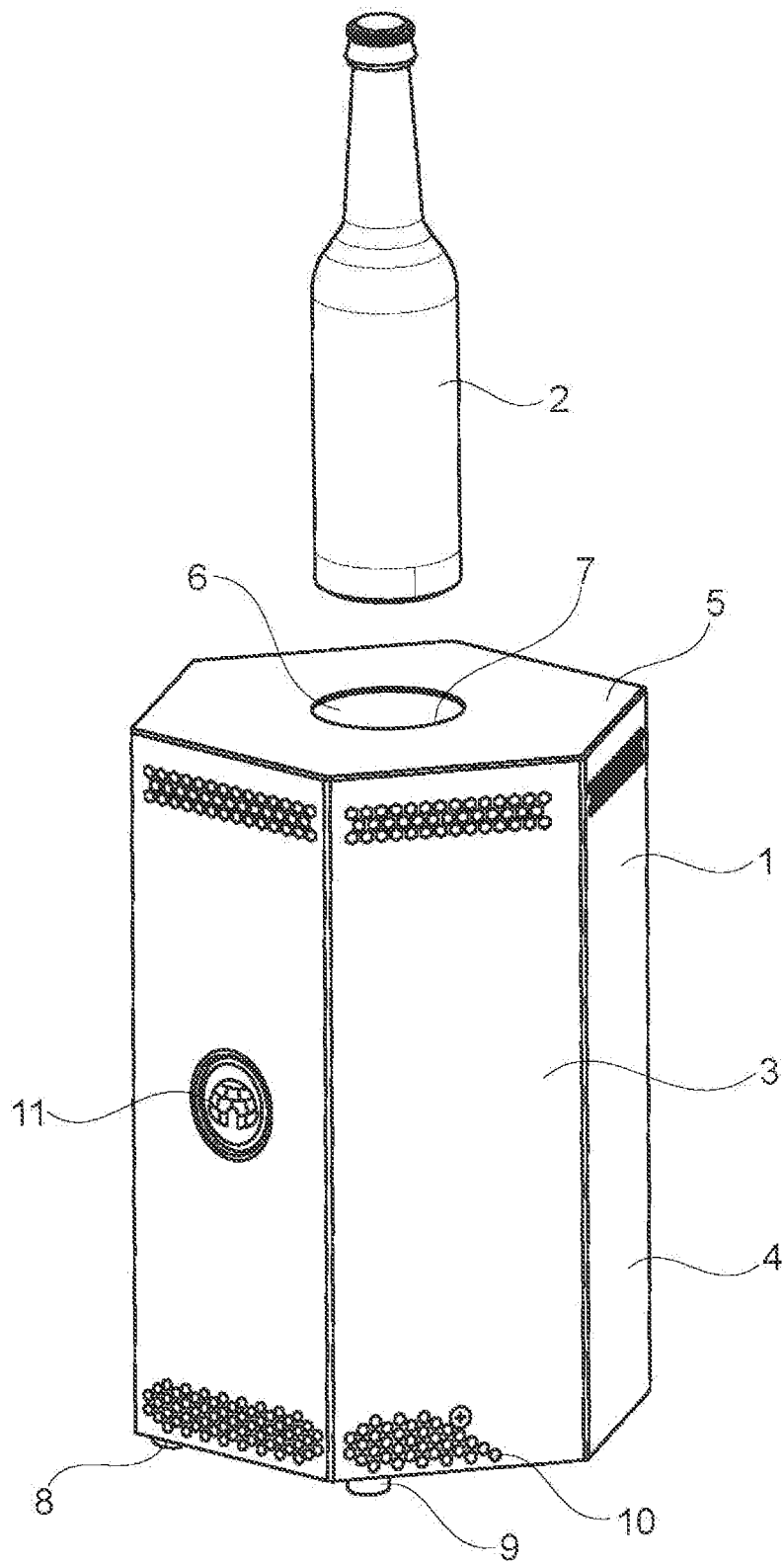
FIG. 1 shows a schematic illustration of an arrangement having an apparatus for thawing a frozen drink and a glass drinking bottle, which contains the frozen drink.
Figure 2:
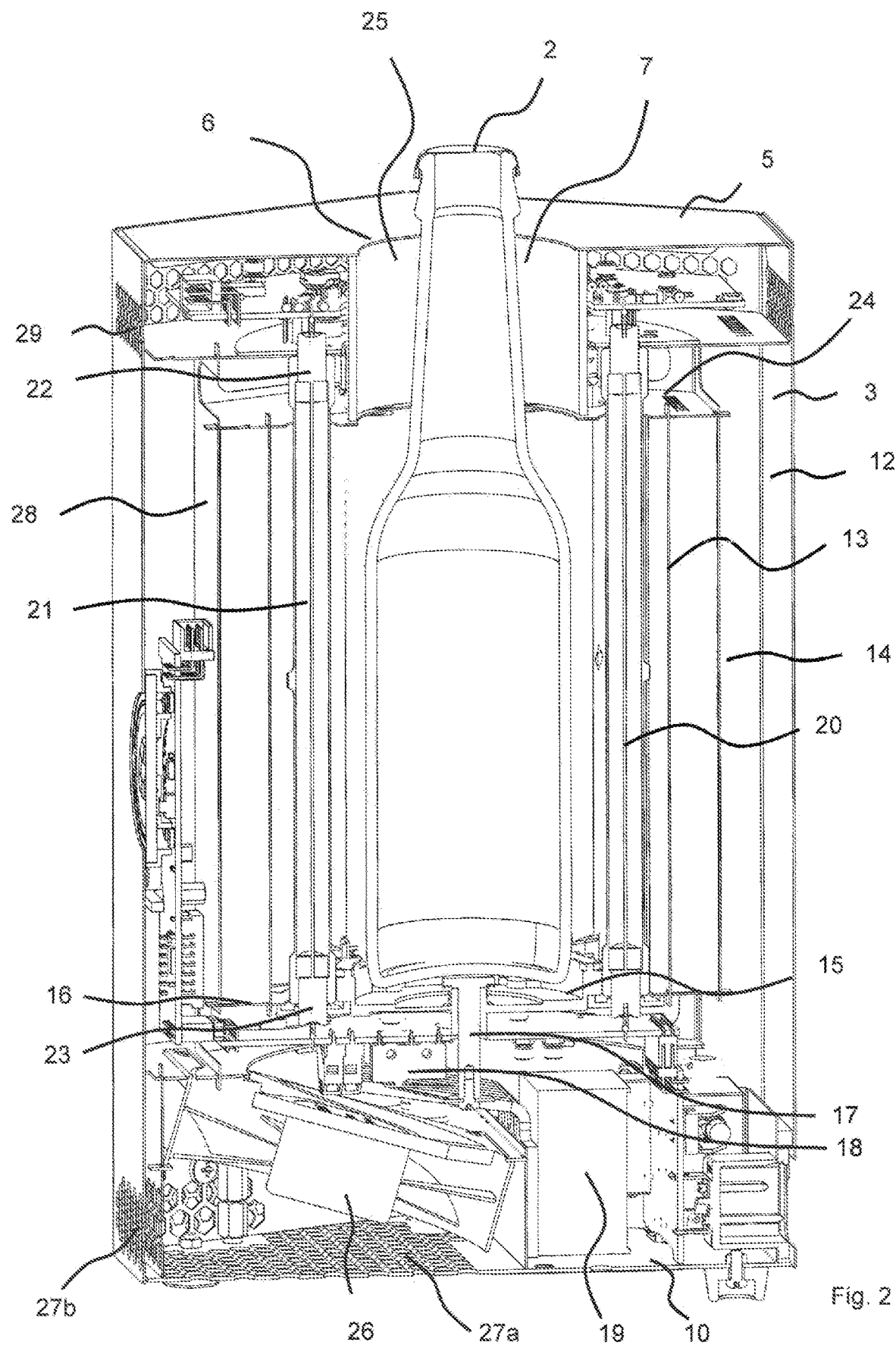
FIG. 2 shows a schematic illustration of the apparatus from FIG. 1 in section, wherein the glass drinking bottle is arranged in a bottle accommodation space.
Figure 3:
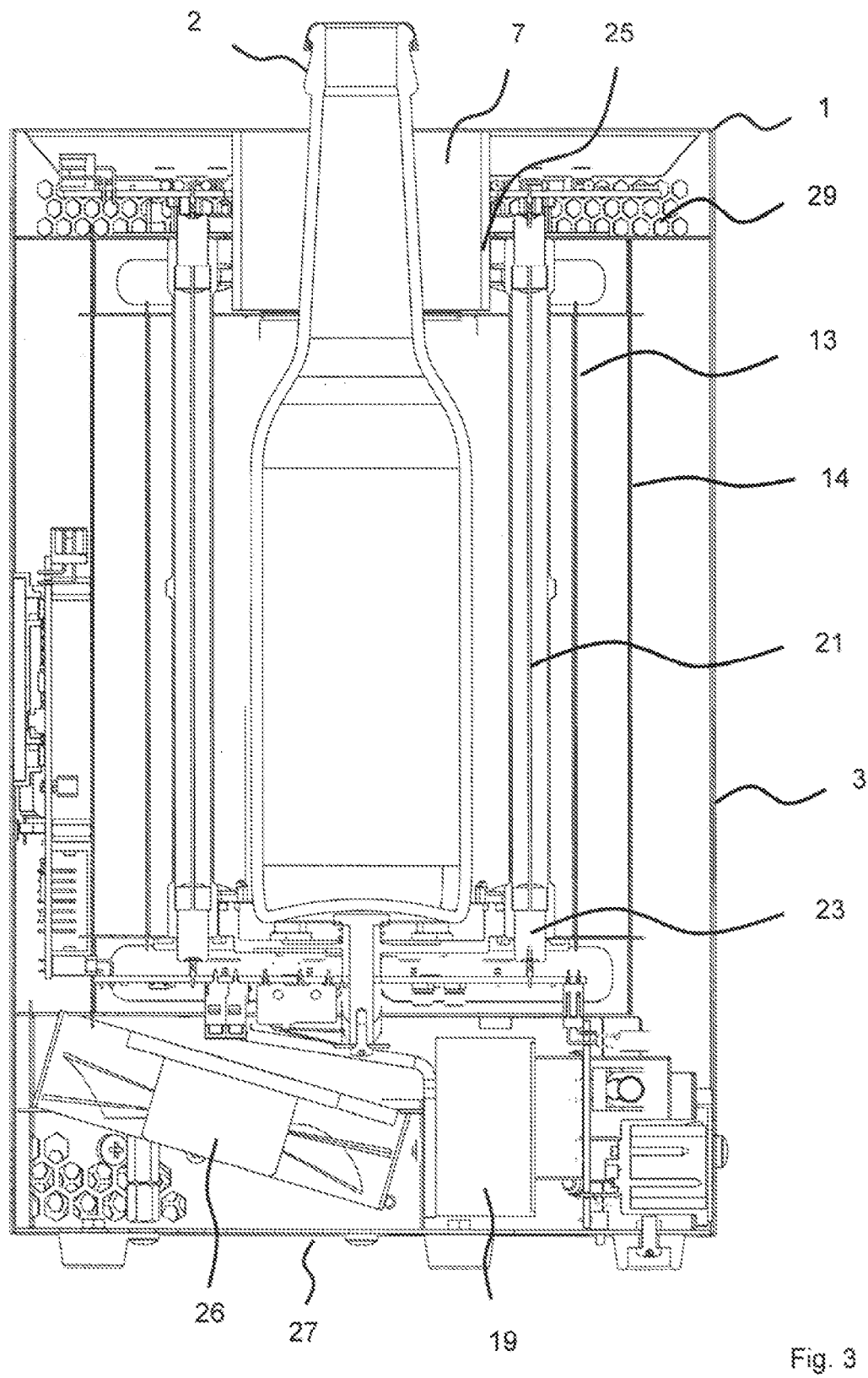
FIG. 3 shows a further depiction of the sectional illustration from FIG. 2.
Figure 4:
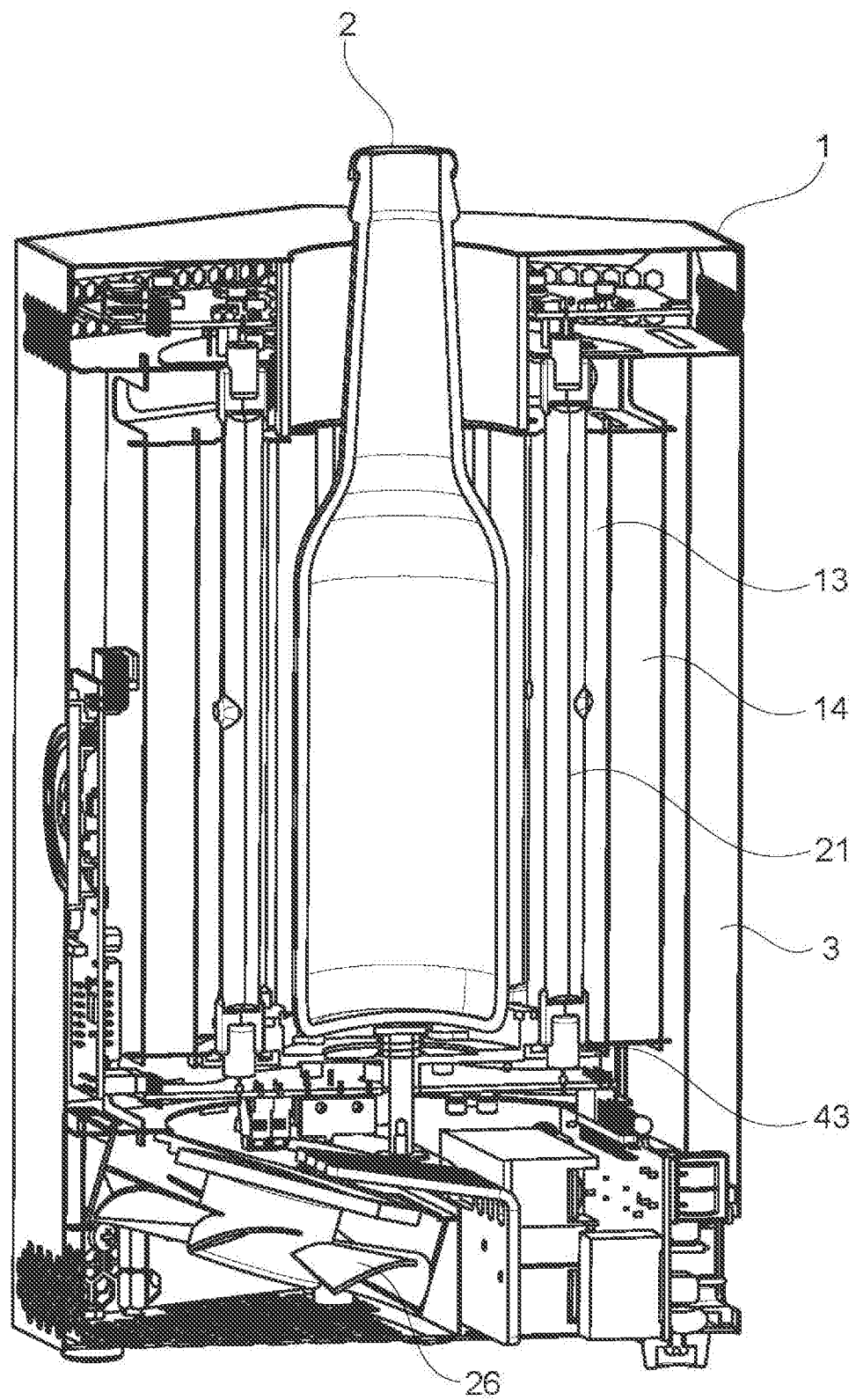
FIG. 4 shows a schematic illustration of the apparatus from FIG. 1 partially in section.

FIG. 1 shows a schematic illustration of an arrangement with the apparatus for thawing the frozen drink and the glass drinking bottle 2, which is still arranged outside of a housing 3 of the apparatus 1. The housing 3 has an outer housing wall 4. A housing opening 6, through which the glass drinking bottle 2 can be introduced into a bottle accommodation space 7, is constructed in the region of a top wall 5. Feet 8, 9 are provided on the housing 3 in a base region 10. Information, for example relating to an operating mode which has just been set, can be displayed to the user by means of a display 11. Thus, it is possible to indicate whether the thawing operation has begun already, is still running and/or has already ended, for example by means of different coloured displays.

FIGS. 2 to 5 show sectional illustrations of the apparatus 1, wherein the glass drinking bottle 2 is arranged in the bottle accommodation space 7.

An inner wall 13 is arranged in the interior 12 of the housing 3 opposite the outer housing wall. An insulating space 14, which is used for thermal insulation, is constructed between the inner wall 13 and the outer housing wall. The insulating space 14 can at least partly be filled with a thermally insulating material.

The glass drinking bottle 2 stands on a sensor device 17, which in the embodiment shown is provided by means of a lower horizontally running wall section 16. In the embodiment shown, the sensor device 17 has a pushbutton 18, which is actuated when the glass drinking bottle 2 is placed on the sensor device 17 in the bottle accommodation space 7. The sensor device 17 couples to a control device 19, which for its part controls the operation of a heating device 20 with a plurality of heat radiators 21. The plurality of heat radiators 21 are arranged around the bottle accommodation space 7 and during thawing operation emit thermal radiation directly onto the glass drinking bottle 2, in order to thaw the frozen drink arranged therein. Electrical connection or contact regions 22, 23, for example in the form of sockets, are spatially separated from the bottle accommodation space 7 by means of the lower horizontal wall section 16 and an upper horizontal wall section.

A grip protector 25, which for example consists of a glass material and prevents the user from inadvertently coming into contact with the heat radiators 21 and the electrical connection and contact regions 22, 23 when inserting or removing the glass drinking bottle 2, extends between an upper horizontal wall section 24 and the housing opening 6.

The apparatus 1 has a thermal insulating and cooling device, which is formed with an air conveying device 26, which is realized as a fan in the embodiment illustrated. The air conveying device 26 draws air through air intakes 27a, 27b, which are formed at the base side and wall side in the embodiment, into an air duct 28, which extends to an air outlet 29. The air duct 28 here conducts the cooling air past the electrical contact or connection regions 23, and through the thermal insulating space 14 and past the electrical contact and connection regions 22 to the air outlet 29, which in the design shown is formed by means of openings in a side wall section.

During introduction and removal, the glass drinking bottle 2 is guided by means of a bottle guide 32, which in the example shown is formed with glass tubes or rods 33, which are arranged in a circumferentially spaced manner.

Figure 8:
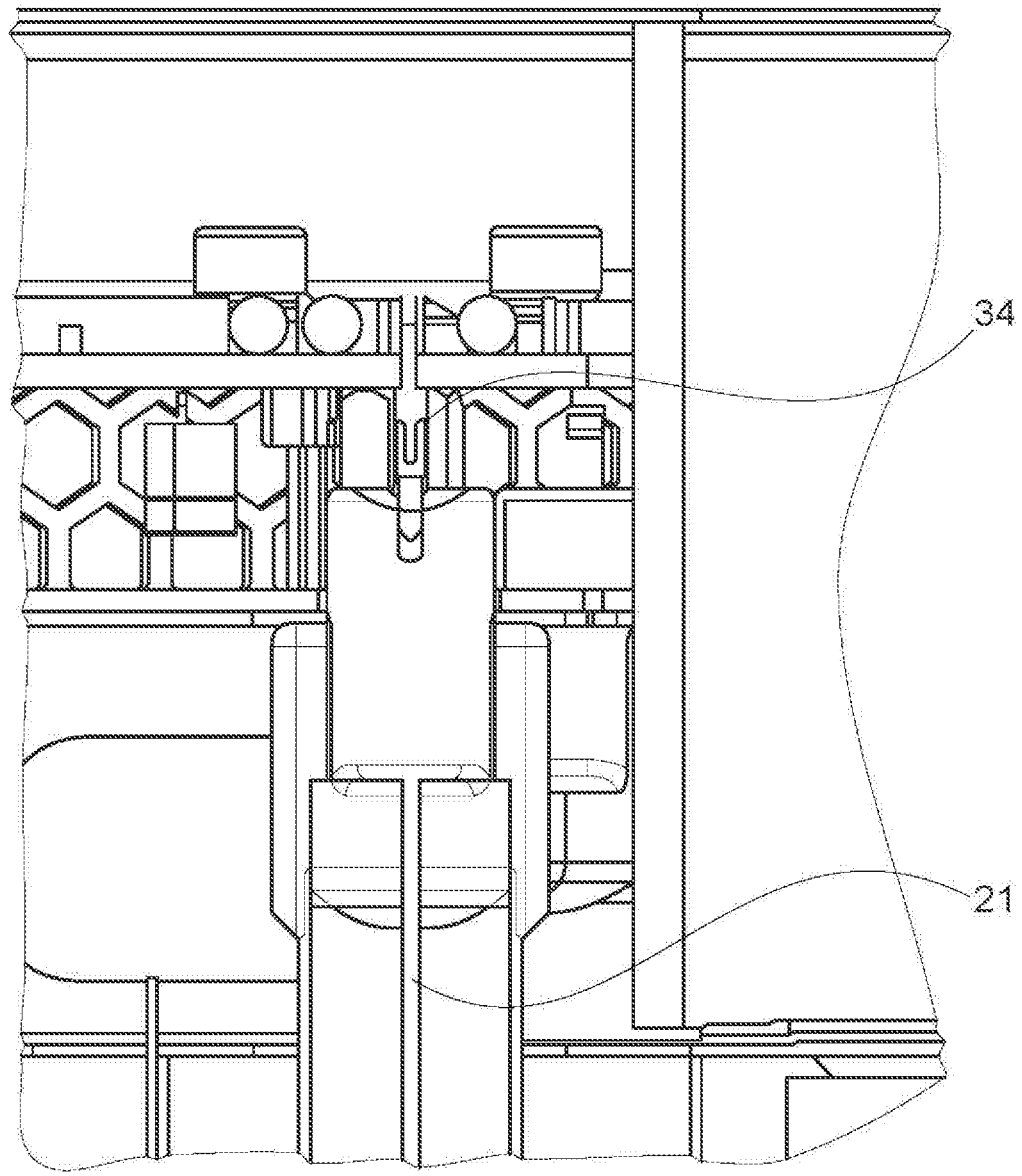
FIG. 8 shows a sectional illustration for the electrical contacting of the heat radiators inside the apparatus from FIG. 1.

Spring contact pins 34 electrically contact the heat radiators 21 at both ends of the respective heat radiator 21. They may be set up to compensate by means of their flexible extensibility for possible manufacturing tolerances and change in length owing to the extension of the heat radiators 21 during operation (FIG. 8). The apparatus 1 can be easily unmounted and also remounted by means of pluggable electrical connections. Thus, the heat radiators 21 or other components can be exchanged easily. The apparatus 1 can be completely mounted and unmounted using simple, inexpensive and universally available tools (for example: a cruciform screwdriver, a screwdriver and combination pliers).

Figure 9:
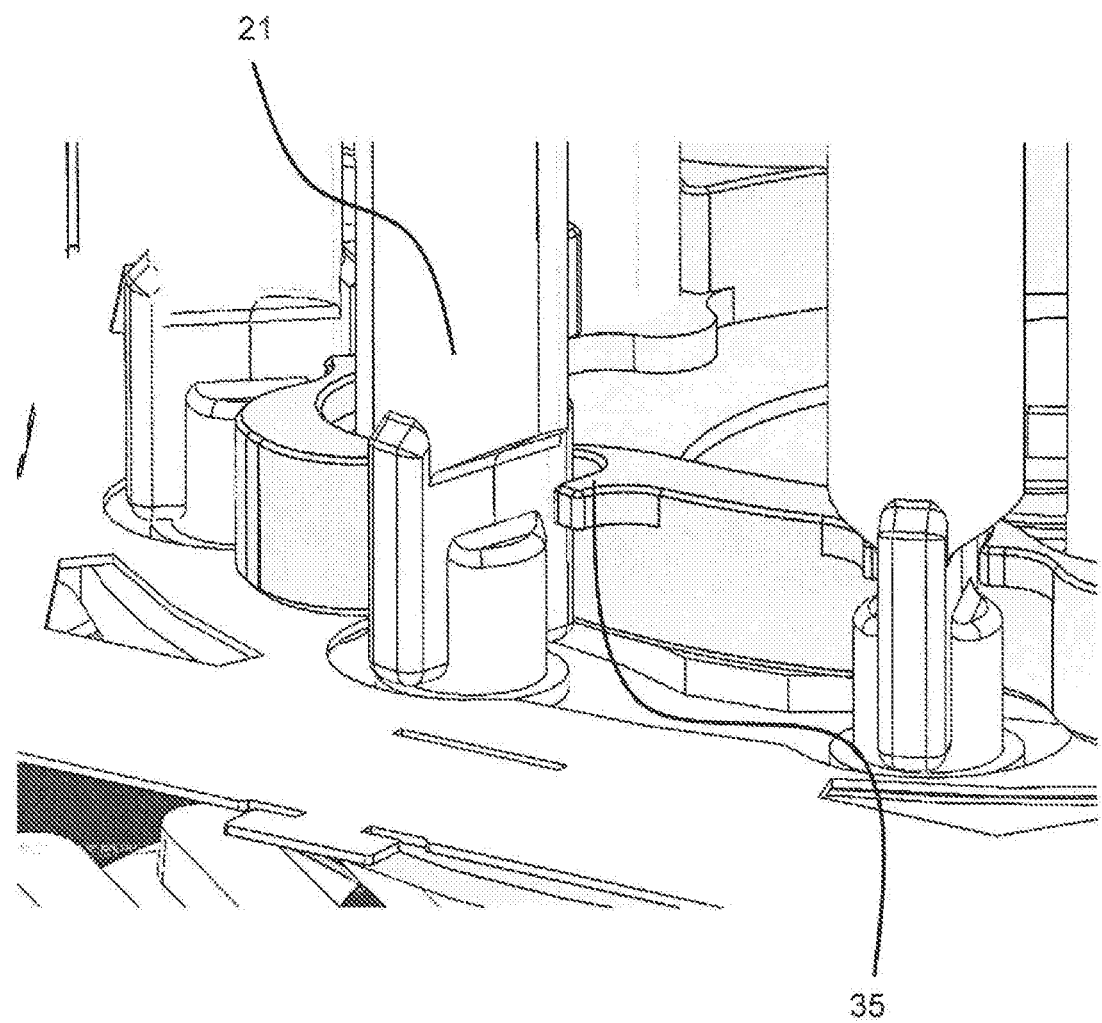
FIG. 9 shows a schematic illustration for guiding the heat radiators to protect against twisting inside the apparatus from FIG. 1.

The heat radiators 21 are in each case protected from twisting with the aid of a temperature-resistant guide 35, for example a metal guide (FIG. 9). Twisting of the heat radiators 21, which may be coated with a highly reflective white ceramic, may be problematic during operation, as the radiant energy is to be directed onto the glass drinking bottle 2 in the centre of the apparatus 1. If the heat radiators 21 are twisted with respect to the position bundling the radiant energy, the efficiency ratio falls and the energy must additionally be dissipated via the housing 3 as power loss.

Figure 10:
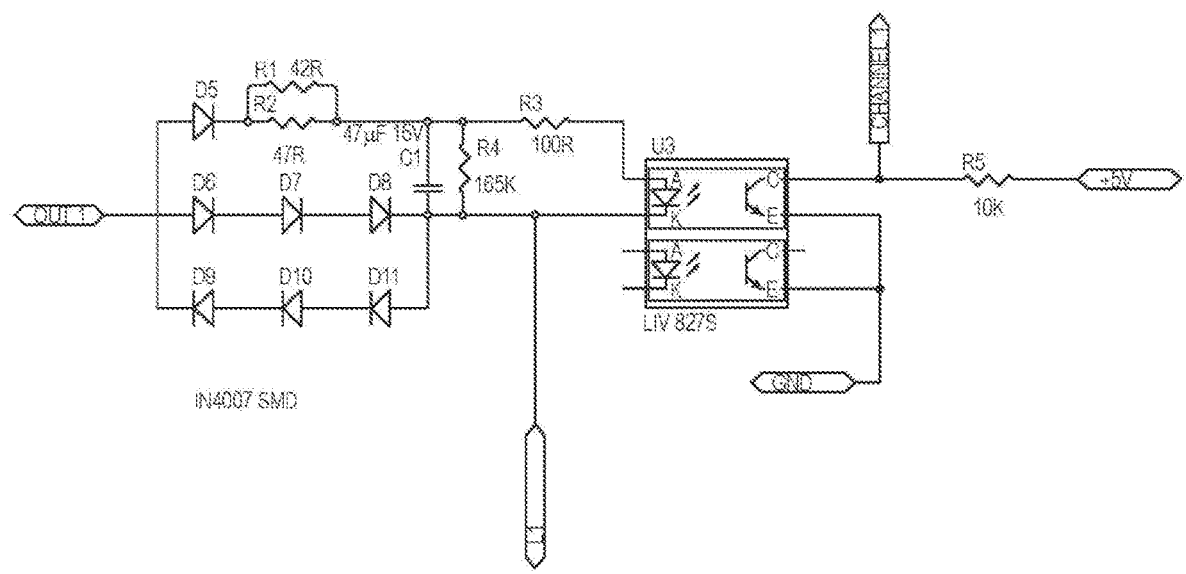
FIG. 10 shows a circuit diagram of a circuit for detecting the defectiveness of a heat radiator inside the apparatus from FIG. 1.
Figure 11:
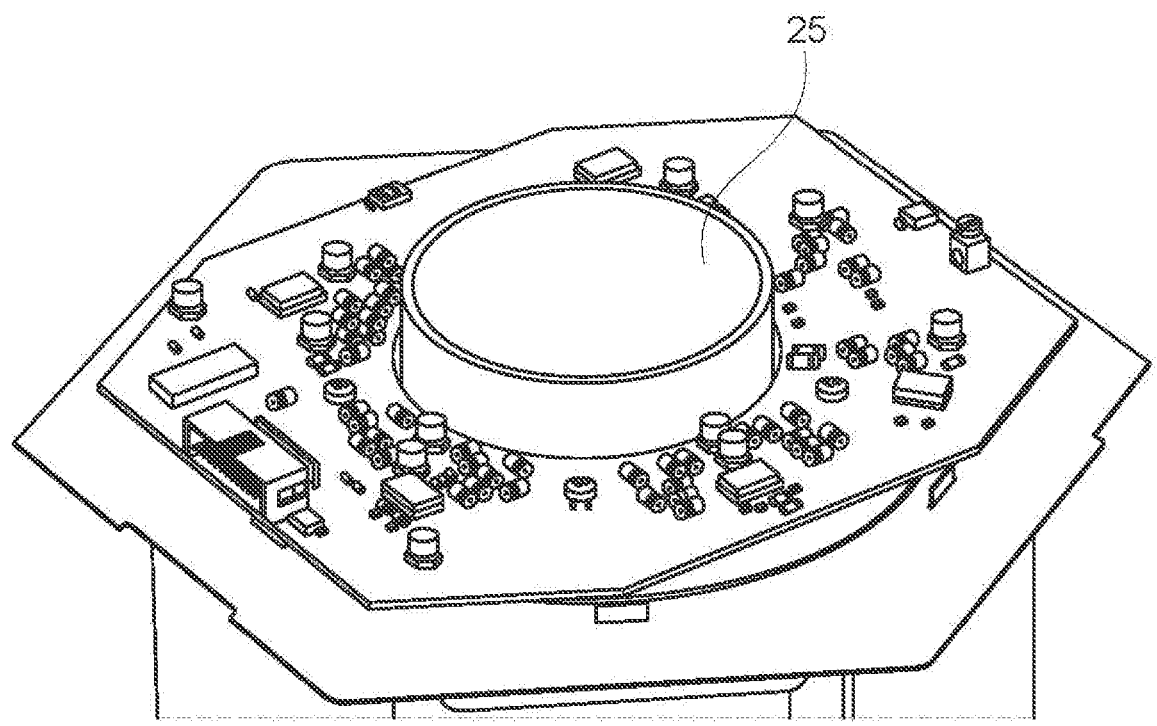
FIG. 11 shows a schematic illustration of circuits for detecting the defectiveness of a plurality of heat radiators inside the apparatus from FIG. 1.

It is possible to detect whether a connected heat radiator 21 is defective by means of a respective electronic circuit (cf. FIG. 10, FIG. 11). A heat radiator 21 is connected at OUT1 and connected to N. L1 is connected to 230 V AC. If the heat radiator 21 is functional, a current flows via the diode network D5-D11, which leads to a potential difference of approximately $3 > 0.7$ V=2.1 V. The capacitor C5 charges during each positive half-wave and drives a light-emitting diode (LED) in the optocoupler U3. A voltage of 0 V is applied at the output Channel 1. If the heat radiator 21 is defective, the capacitor C5 no longer charges, the LED in the optocoupler U3 is extinguished, the optocoupler U3 blocks and 5 V are applied at the output Channel 1. The output Channel 1 is connected to a microcontroller and is analysed by the same.

The missing heating output due to defective heat radiators 21 can be determined by means of a control algorithm and compensated with the aid of a longer heating time. The control algorithm can be set up in such a manner that the thermal energy supplied overall by the non-defective heat radiators 21 remains constant, independently of the number of defective heat radiators 21, as long as a defined number of defective heat radiators 21 is not exceeded.

An acoustic sound signal can signal a defect of a heat radiator 21. The display 11 can indicate the position of the defective heat radiators 21 to the user. If a defined number of defective heat radiators 21 is exceeded, the operation of the apparatus 1 can be adjusted and a notification about required maintenance can be displayed on the display 11.

Figure 12:
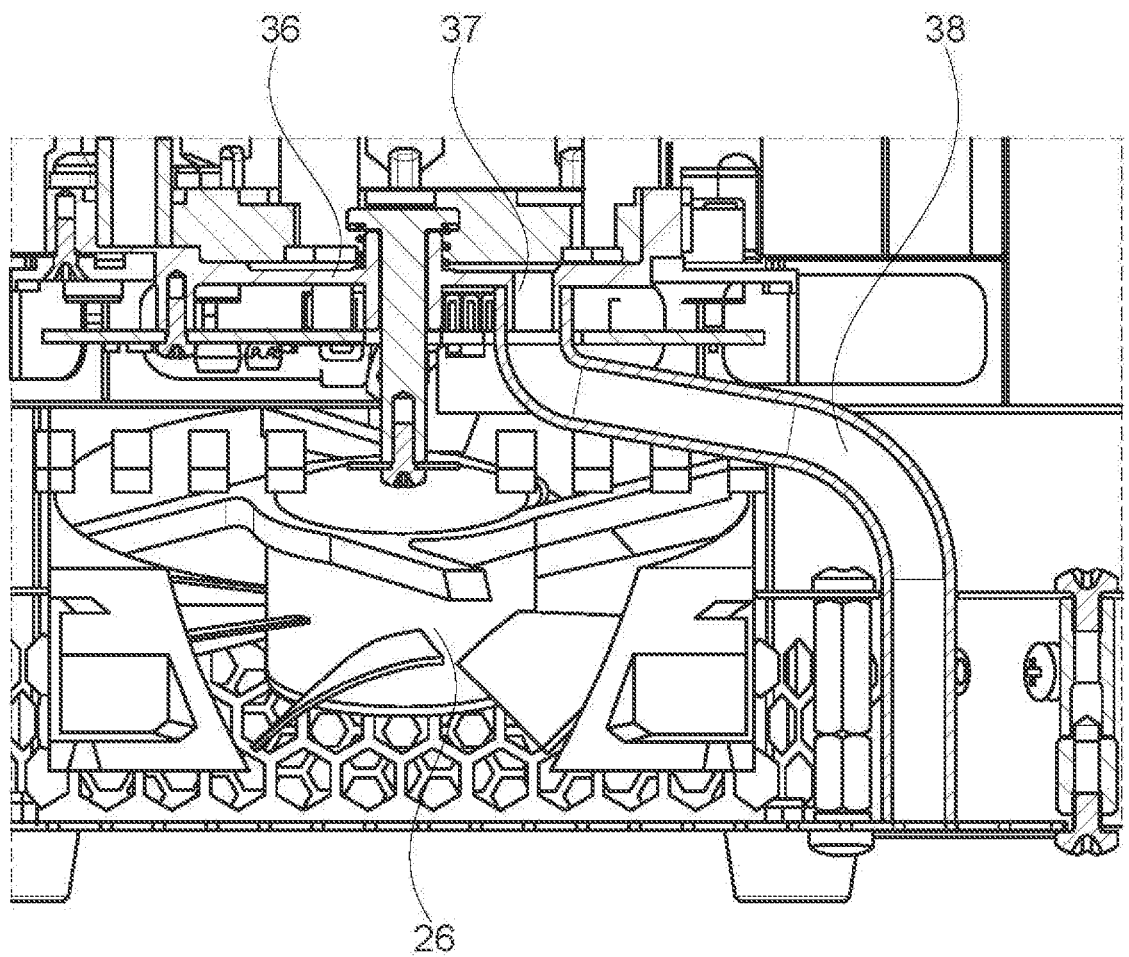
FIG. 12 shows a sectional illustration of a water drainage system inside the apparatus from FIG. 1.

The danger of a short circuit is reduced with the aid of a water drainage system (cf. FIG. 12). The water drainage system has a temperature-resistant tank 36 (for example made from aluminium) with a drainage opening 37 and an accommodation for all important components such as the glass tubes or rods 33. The water drainage system safely conducts all of the water appearing in the tank 36 out of the housing 3 via the drainage opening 37 through a drainage line 38, which is formed by means of a hose or a pipe for example.

Electrical circuits, which must be protected from water are located in the lower part of the apparatus 1. The water is created by means of frosted deep-frozen glass drinking bottles 2 in particular. Ice layers on the glass drinking bottles 2 are created for example during storage of the glass drinking bottles 2 in deep freezes and in particular if the doors of the deep freezes are opened frequently. The air humidity in the ambient air is deposited on the glass drinking bottles 2 and freezes solid layer by layer. The ice layer on the glass drinking bottles 2 melts during the thawing process in the apparatus 1 and drops down below the glass drinking bottle 2. In the case of many glass drinking bottles 2 to be thawed, large quantities of water may be created as a result, which must be conducted safely out of the housing 3.

Figure 13:
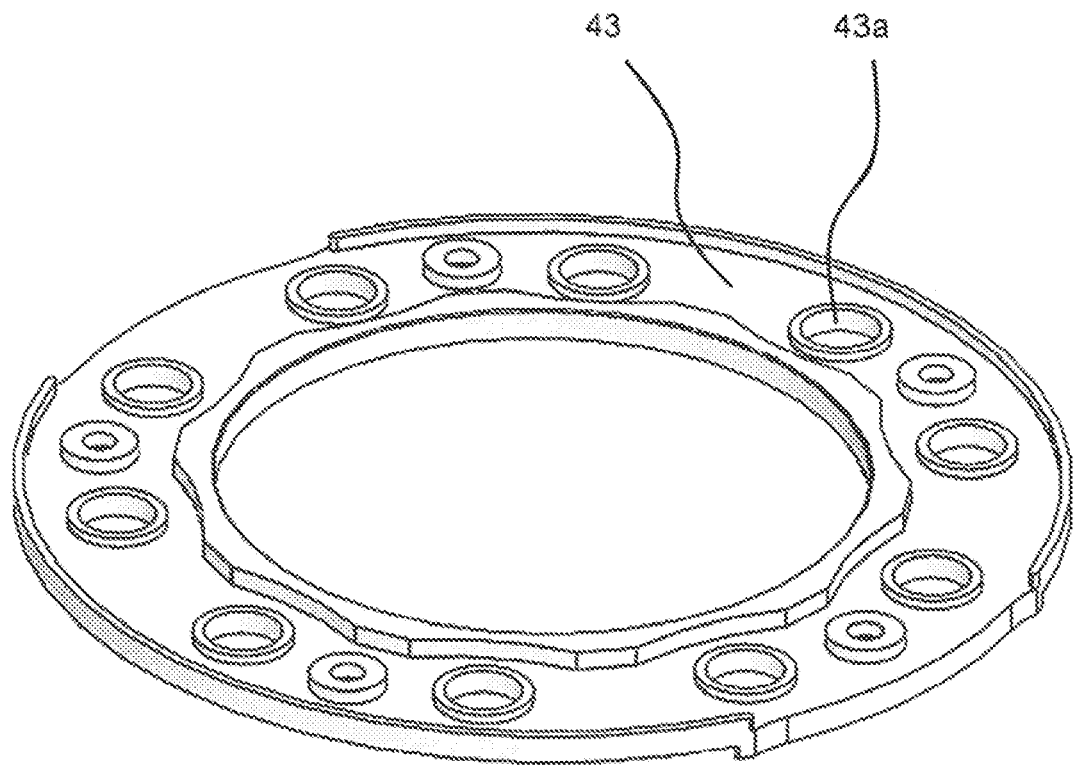
FIG. 13 shows a schematic illustration of a channel for collecting water inside the apparatus from FIG. 1.

Excess water, which gets outside of the tank 36, is collected with the aid of a channel 43 (FIG. 13). The channel 43 consists of an electrically non-conductive temperature-resistant material (for example polytetrafluoroethylene, PTFE) and additionally forms a centring device by means of centring openings 43a for the sockets of the heat radiators 21. The material of the channel 43 is electrically non-conductive, so that water, which appears at the sockets of the heat radiators 21 cannot cause a short circuit with conductive parts of the housing 3. The sockets of the heat radiators 21 may be produced from a porous ceramic, which becomes saturated with water and becomes electrically conductive as a result. The sockets of the heat radiators 21 may become very hot during operation, which is why the materials used are sufficiently temperature-resistant. Therefore, for electrically insulating parts, for example, ceramic materials such as for example aluminium titanate, aluminium oxide, zirconium oxide, silicon nitride, aluminium silicate or high-temperature-resistant technical plastics such as polytetrafluoroethylene (PTFE), polyetheretherketone (PEEK), polyetherketone (PEK), perfluoroalkoxy polymers (PFA), polyvinylidene fluoride (PVDF), polyethersulphone (PES), polysulphone (PSU), polyamideimide (PAI), polyimide (PI) or polyphenylene sulphone (PPSU), are used. For electrically conductive components, various metallic alloys, such as for example high-grade steel 1.4301 or aluminium EN AW-2007, may be used.

The channel 43 has additional defined drainage points, in order to allow any water which is conveyed to only drain at defined points.

Figure 14:
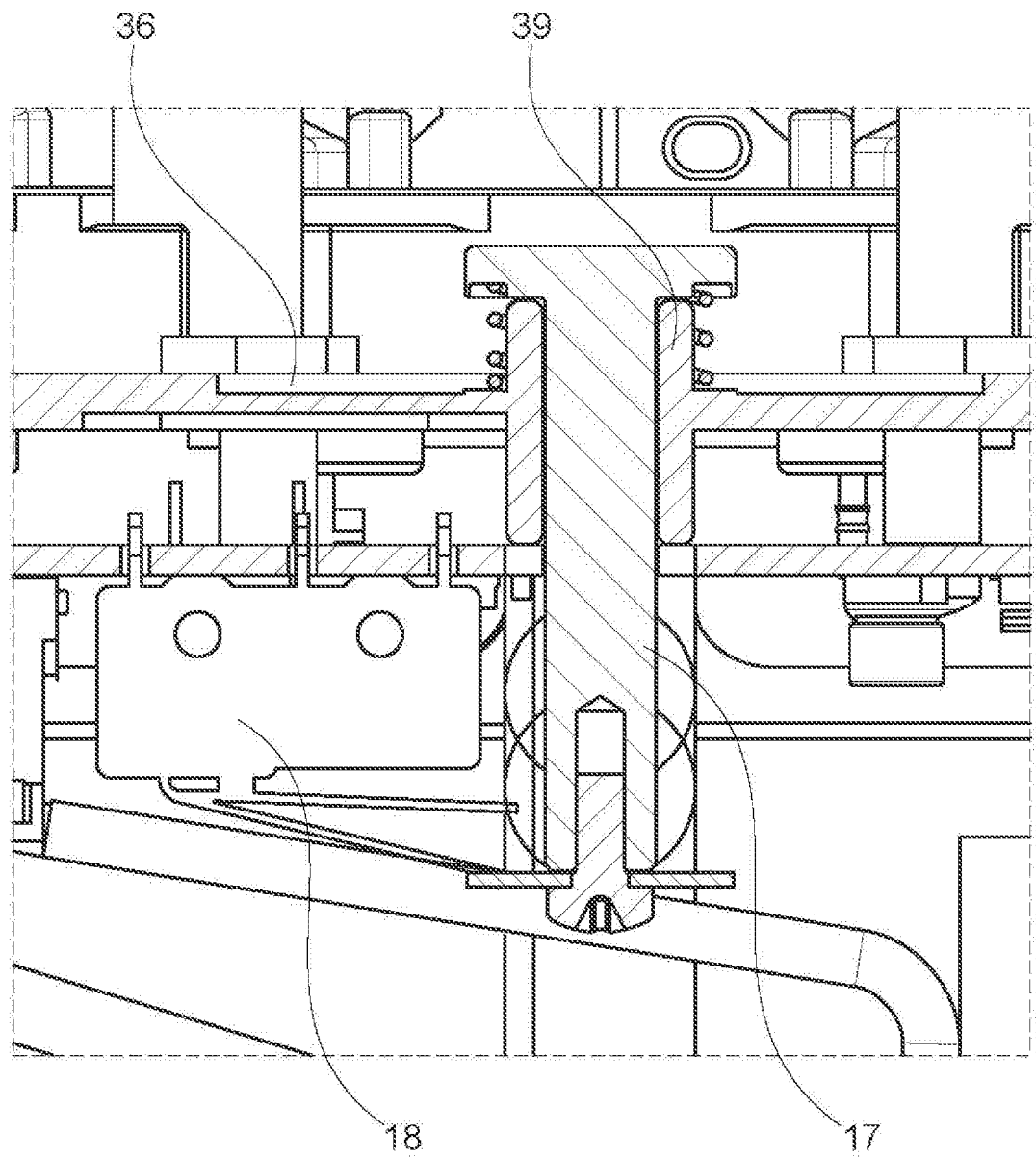
FIG. 14 shows a sectional illustration of the embedding of a sensor device for determining weight inside the apparatus from FIG. 1.

By means of the sensor device 17, whether the glass drinking bottle has been inserted is detected on the basis of the weight of the glass drinking bottle 2, and subsequently the thawing operation is started. Empty glass drinking bottles 2 are detected owing to the low weight thereof. Then, the thawing operation is not started. The embedding of the sensor device 17 is realized in a watertight manner (FIG. 14). Condensation water or other liquids which arise cannot flow along the sensor device 17 in the lower part of the housing 3. The sensor device 17 is mounted in an elevated manner with respect to the tank 36 by means of a socket 39, as a result of which no water can get into the guide rod of the sensor device 17.

Figure 15:
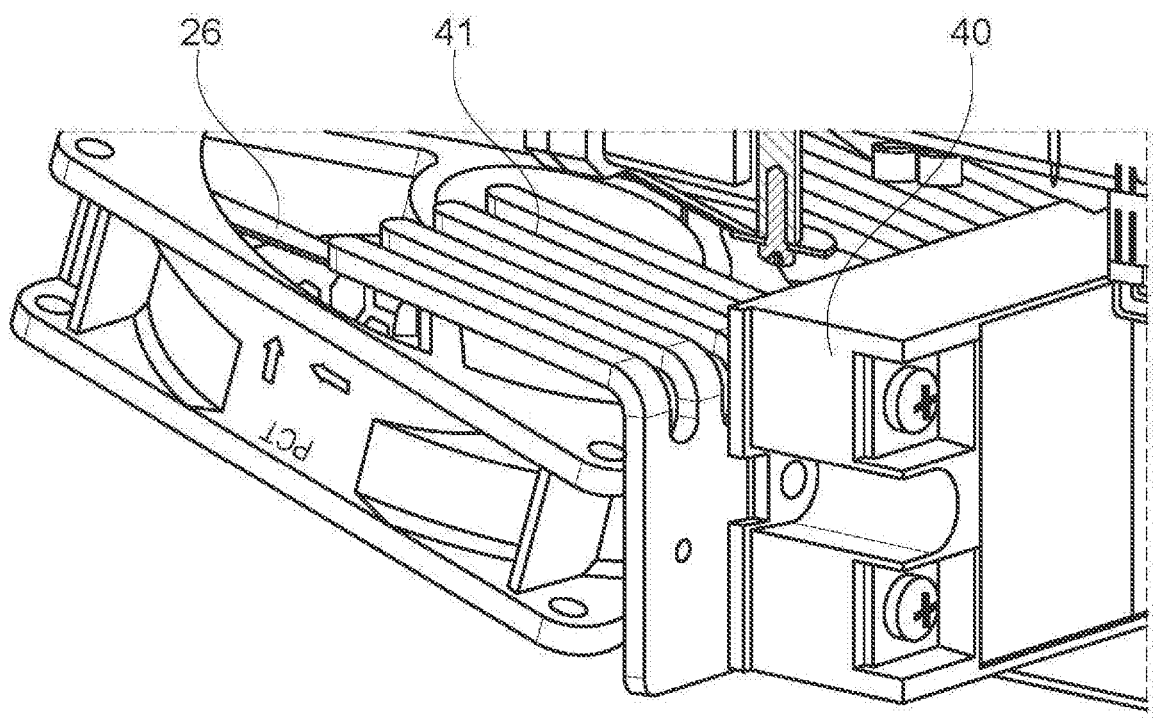
FIG. 15 shows a schematic illustration of a dimmer with heat sinks inside the apparatus from FIG. 1.
Figure 16:
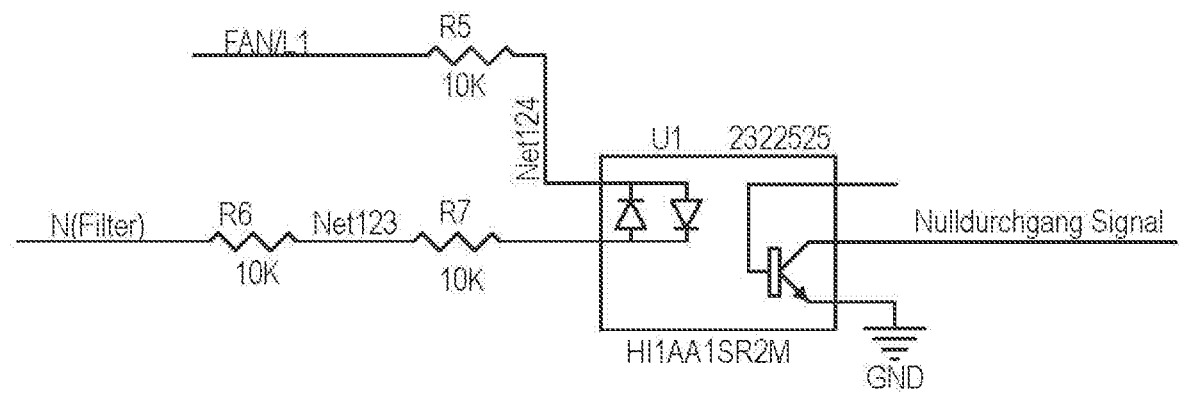
FIG. 16 shows a circuit diagram for detecting zero crossings of the AC mains.

The apparatus 1 has a system for adjusting the heating output in the event of a cold start of the apparatus 1 (with cold heat radiators 21) to prevent mains overloads (FIG. 15). An additional dimmer prevents overloading of the power network during a cold start. The electrical resistance of the heat radiators 21 is temperature-dependent and lower in the cold state than in the warm state. In the cold state, all heat radiators 21 are more conductive than during continuous operation in the warm state, which is why an impermissibly high initial current can flow, which may briefly overload the power network. Even after a few fractions of a second, the heat radiators 21 heat up and the heating output decreases considerably. The heating output data indicated by the lamp manufacturers always relate to continuous operation in the warm state and not to the switch-on procedure. The more bars are operated simultaneously, the more pronounced the influence on the power network becomes. Directly after the switch-on procedure, the dimmer ensures a considerably reduced output by dimming the heating output. This may take place for example by means of a semiconductor relay 40 (cf. FIG. 15), which is periodically switched on and off, so that on temporal average, less energy flows and thus the average of the output is reduced considerably. For cooling, the semiconductor relay 40 is connected to a heat sink 41, which is ventilated by the air conveying device 26. After a short time (for example one second), the output can be increased to the standard level, as the heat radiators 21 have been sufficiently heated. The duration of the warm-up phase depends on factors such as the percentage share of the reduced output (dimming) and the conductances of the heat radiators 21 in the cold state, and must be adapted once to the heat radiators 21 used. Alternatively to the use of a dimmer, a temporally offset switch-on of the heat radiators 21 can also be carried out.

The apparatus 1 has a system for adapting the heating output in the event of the overheating of the apparatus 1 to avoid forced cooling phases. The heating output can be varied during operation by means of a dimmer, for example the semiconductor relay 40. Due to periodic switching on and off, little energy flows on temporal average, which is why the average of the output can be reduced considerably. This is necessary, if during continuous operation, the power loss can no longer be dissipated sufficiently rapidly by means of the fan 26. In order to avoid a cooling phase in the event of critical temperatures being exceeded, the heating output can be reduced already in advance, and the apparatus 1 can be used permanently and continuously without bothersome waiting periods. This offers the user added value and entails an increased user friendliness of the apparatus 1.

Software controls the heating output and detects the temperatures in the interior 12 of the housing 3. If the temperature in the interior 12 of the housing 3 exceeds one or more threshold values, the heating output can be reduced. The software detects the amount of energy already supplied by means of integration of the supplied heating output over time as a function of the number of defective heat radiators 21 and the dimming factor δ. The supplied energy is calculated according to the formula $$E = \int_0^{t_e} (P_W \times n_W \times \delta(\Delta \vartheta) - P_V(\Delta \vartheta)) \times dt \tag{1}$$

Here, E is the amount of energy supplied to the drink, $P_W$ is the output per heat radiator 21, $t_e$ is the thawing time, $n_W$ is the number of functioning heat radiators 21, the dimming factor δ is the output adjustment of the dimmer in percent of the maximum output, $E_{-18°\,C.}$ is the required amount of energy, in order to thaw a deep-frozen drink from −18° C. to the temperature for consumption, $P_V$ is the power loss due to thermal losses due to waste heat in the housing 3 and Δϑ is the temperature difference between the ambient temperature and temperature in the interior 12 of the apparatus 1.

The thawing time results as a function of variables arising in the formula (1). The thawing time is reached for example if the supplied energy E equals the required energy $E_{-18°\,C.}$. The dimming factor δ can assume values between 0 and 1. In the case of full activation of the dimmer, δ=1, which corresponds to the full heating output of 100%. The reduction of the output $P_W$ and the failure of heat radiators 21 (decrease of $n_W$) lengthens the thawing time required. In the cold state of the apparatus 1, a large part of the supplied thermal energy flows to the housing, in order to heat it to operating temperature. This must be taken into account in the calculation.

The operating temperature of the interior 12 of the housing 3 is detected using a temperature sensor. The ambient temperature of the apparatus 1 is likewise detected by means of a further temperature sensor. The position of the sensor for the ambient temperature was placed in the lower part of the housing 3, for example close to the bottom plate 10. The reason for this is that at other measuring points, heating takes place by means of the heating device 20 and the measurement results may be distorted as a result. The hotter the apparatus 1 becomes, the lower the influence of $P_V$ becomes, as the housing 3 then radiates energy itself and additionally heats the drink with the actual power loss. The value of $P_V$ is determined by means of the temperatures in the interior 12 with respect to the ambient temperature. The dimming factor δ is determined from the ambient temperature, the temperature of the interior 12 and the number of functional heat radiators 21. If the temperature in the interior 12 increases too strongly, output reduction takes place.

The apparatus 1 has detection of zero crossing (exemplary circuit with the component H11AA1 in FIG. 16) to improve the EMC properties, specifically to avoid EMC loads which are damaging for the mains and for the device, and to prevent flickering effects when dimming the power. A detection system identifies each individual zero crossing of the 50 Hz AC mains and thus delivers ideal control points for controlling the dimmer. If dimmers are switched on and off at zero crossing, disruption occurring with regards to the EMC can be minimized. The detection of zero crossings additionally entails the great advantage that flickering effects can be avoided or reduced considerably. The flickering effects can be traced back to phase shifts and non-mains-synchronous switching of dimmers, which switch at zero crossing. Thus, it may come to pass that every n switching procedures, the correct switching time is missed and the half-wave was erroneously not switched through. This effect can be seen with a substantially lower frequency of a few Hz and is therefore particularly disturbing.

Figure 17:
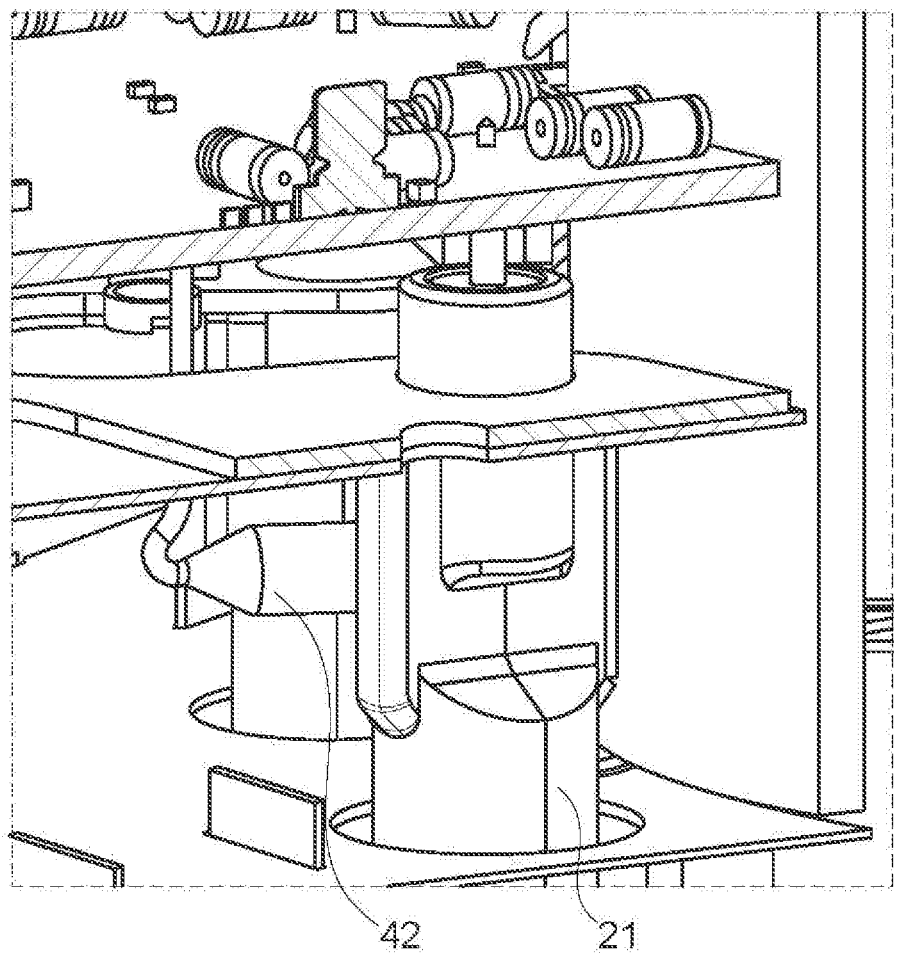
FIG. 17 shows a schematic illustration, partly in section, of a temperature fuse inside the apparatus from FIG. 1.
Figure 18:
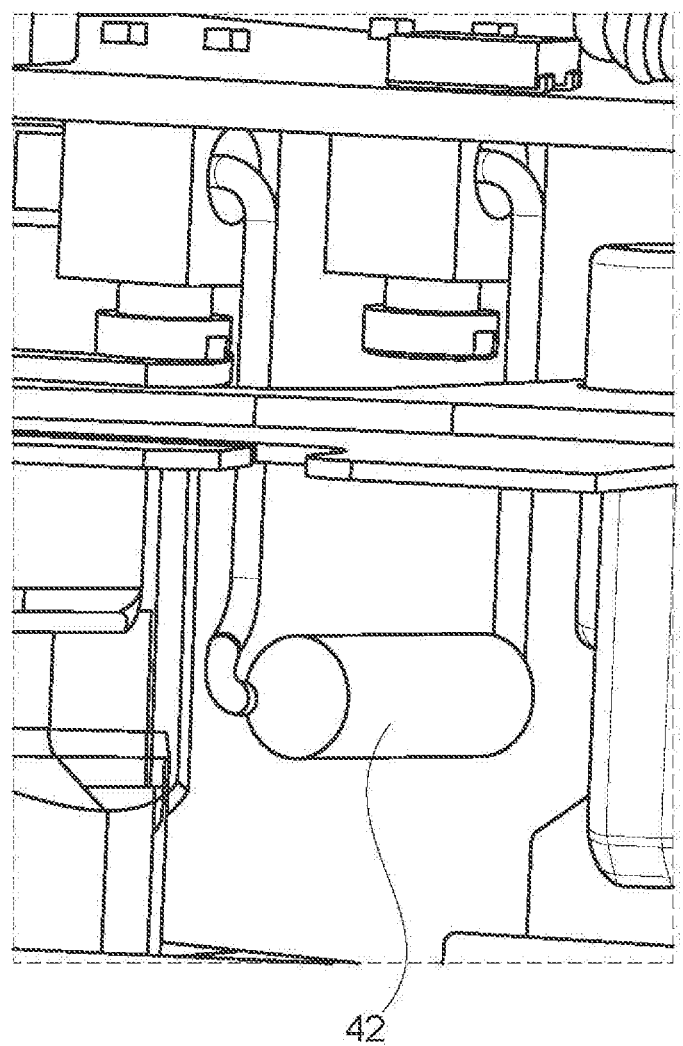
FIG. 18 shows a further schematic illustration, partly in section, of a temperature fuse inside the apparatus from FIG. 1.
Figure 19:
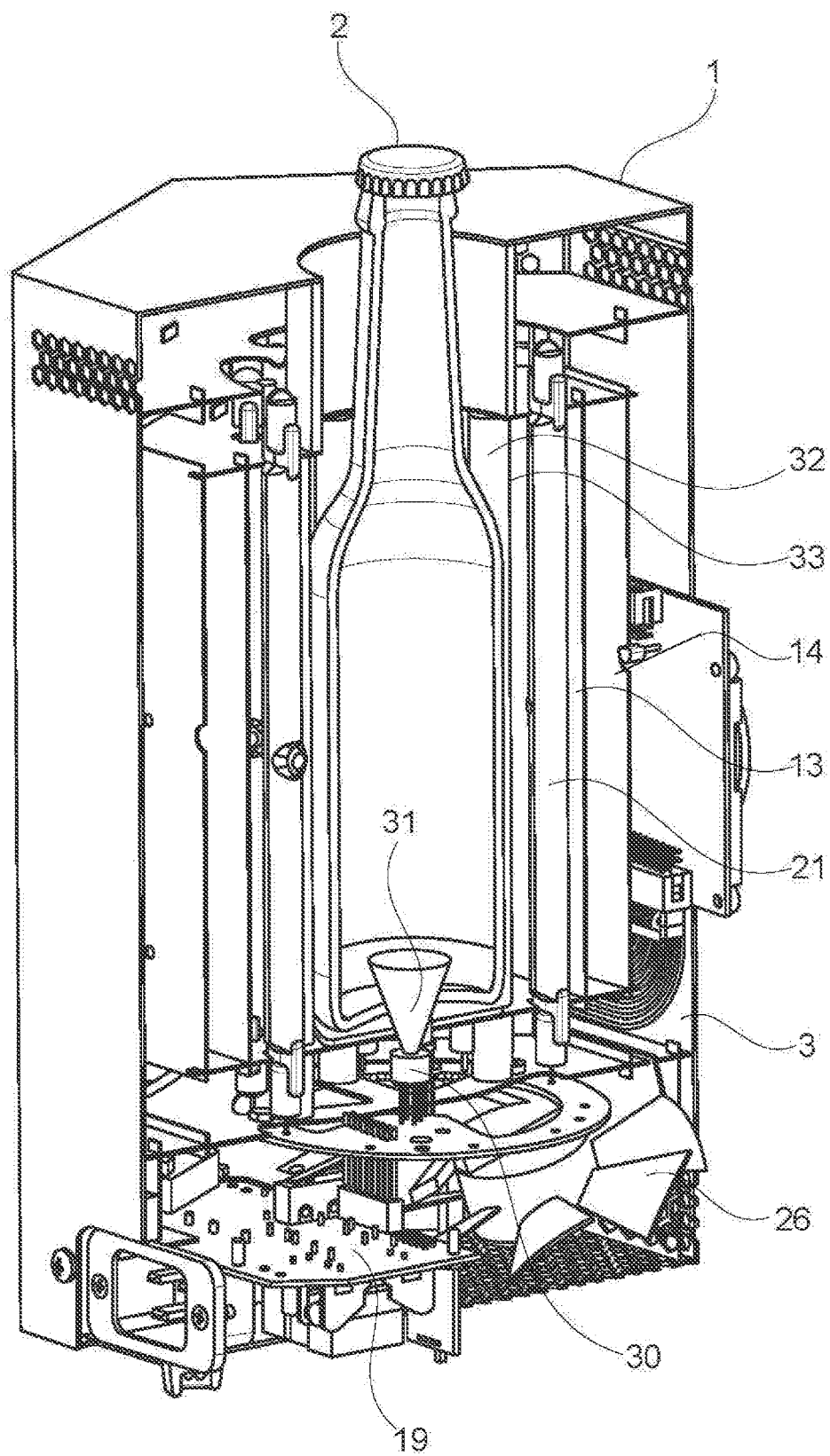
FIG. 19 shows a schematic illustration of an arrangement having an apparatus for thawing a frozen drink and a glass drinking bottle, which contains the frozen drink, having an infrared temperature sensor, partially in section.

The apparatus 1 has a temperature fuse 42, which permanently interrupts the power supply, as further protection against overheating (FIG. 17, FIG. 18). If the temperature of the interior 12 climbs above a threshold value, the temperature fuse 42 is triggered permanently.

In a further exemplary embodiment, a detection device can be provided in the bottle accommodation space 7 or adjacent thereto (FIG. 19), in order to detect the frozen drink in the glass drinking bottle, for example for detecting whether the frozen drink is still substantially frozen through or partially thawed. In the design shown, an infrared temperature sensor 30 is provided, to which a detection region 31 is assigned. Detected signals of the detection device can be given to the control device 19, so that the same controls the heating device 20 during operation as a function of the detected signals, for example with regards to an emitted heating output.

Figure 5:
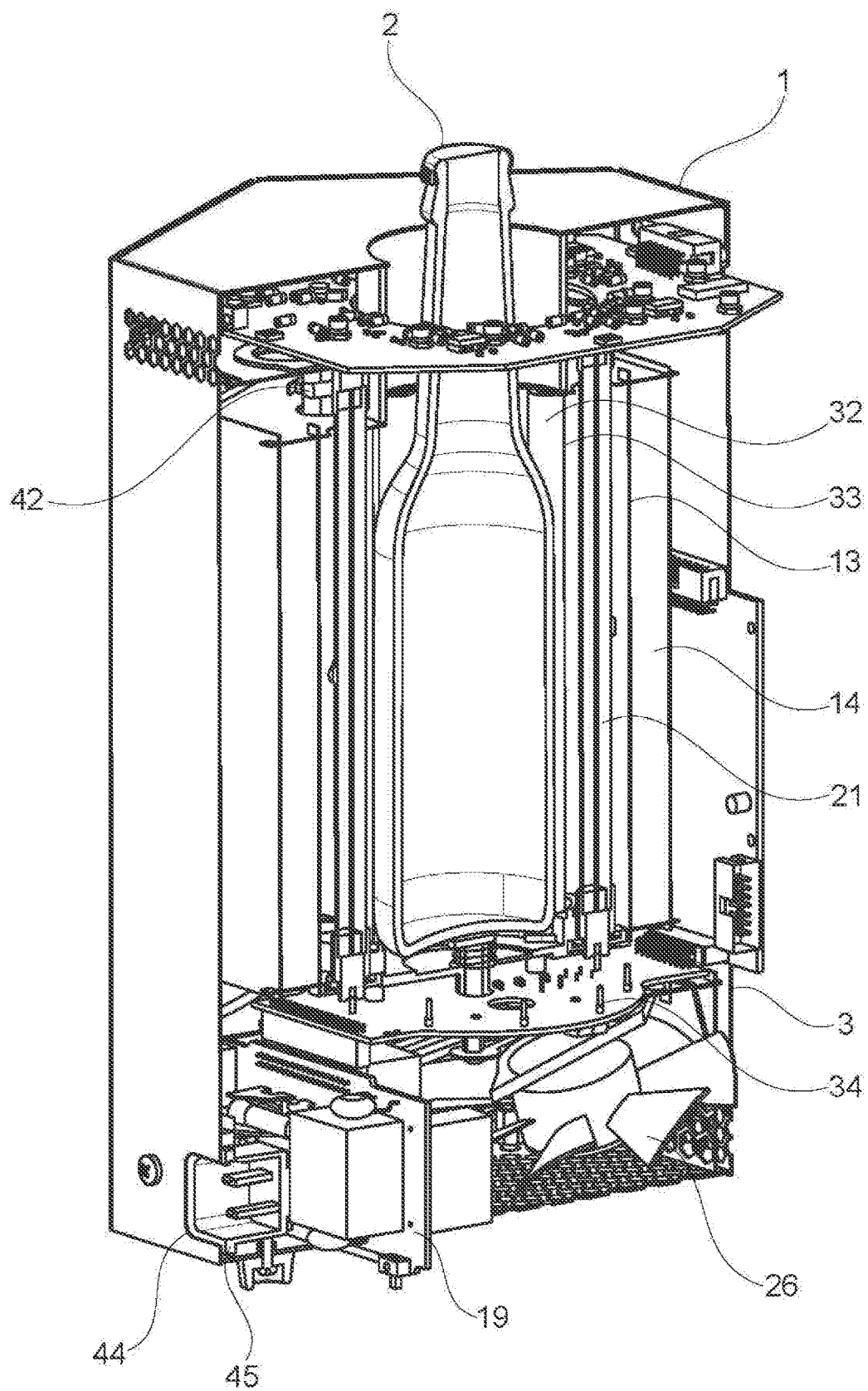
FIG. 5 shows a further schematic illustration of the apparatus from FIG. 1 partially in section.
Figure 6:
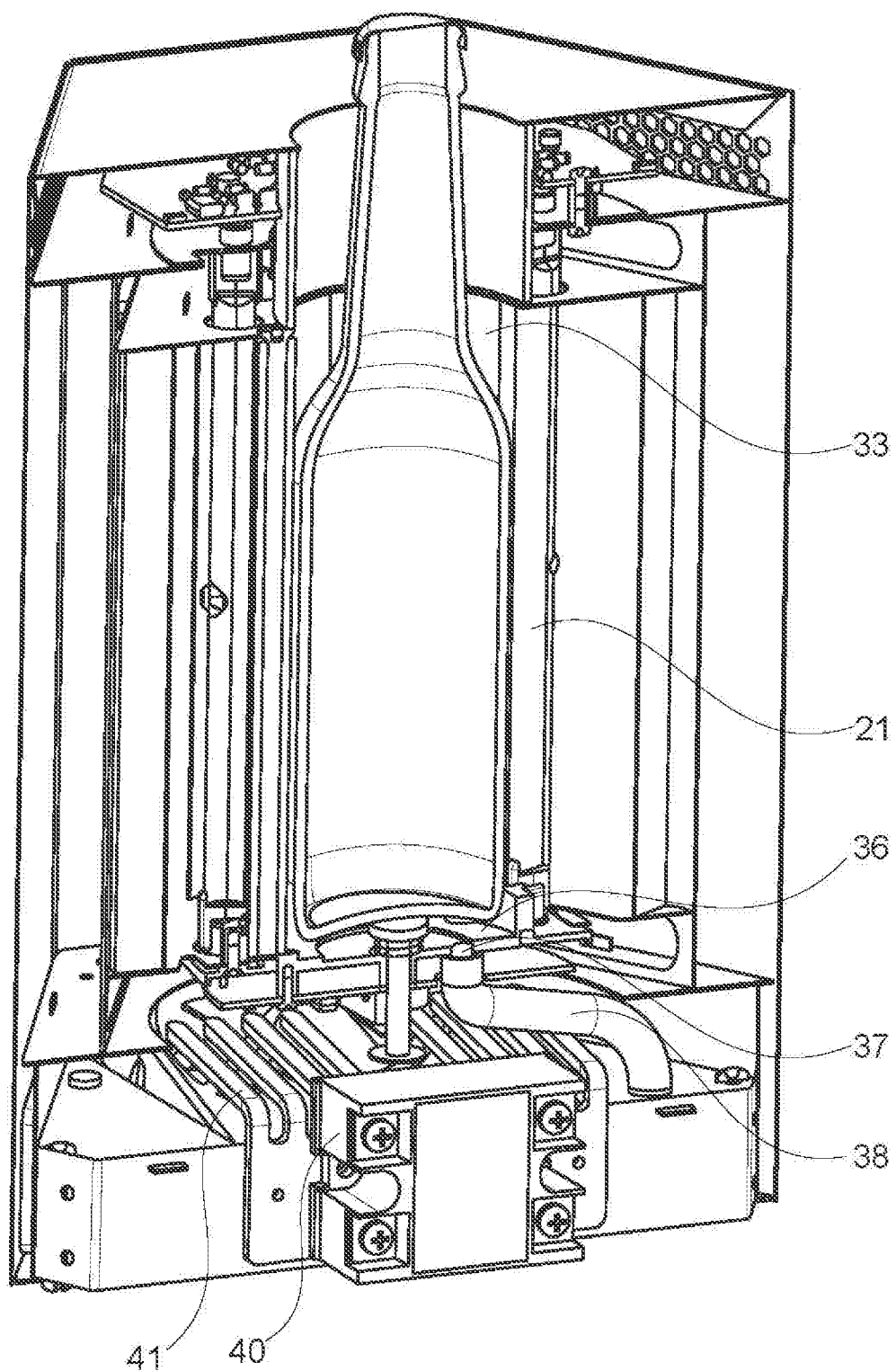
FIG. 6 shows a further schematic illustration of the apparatus from FIG. 1 partially in section.
Figure 7:
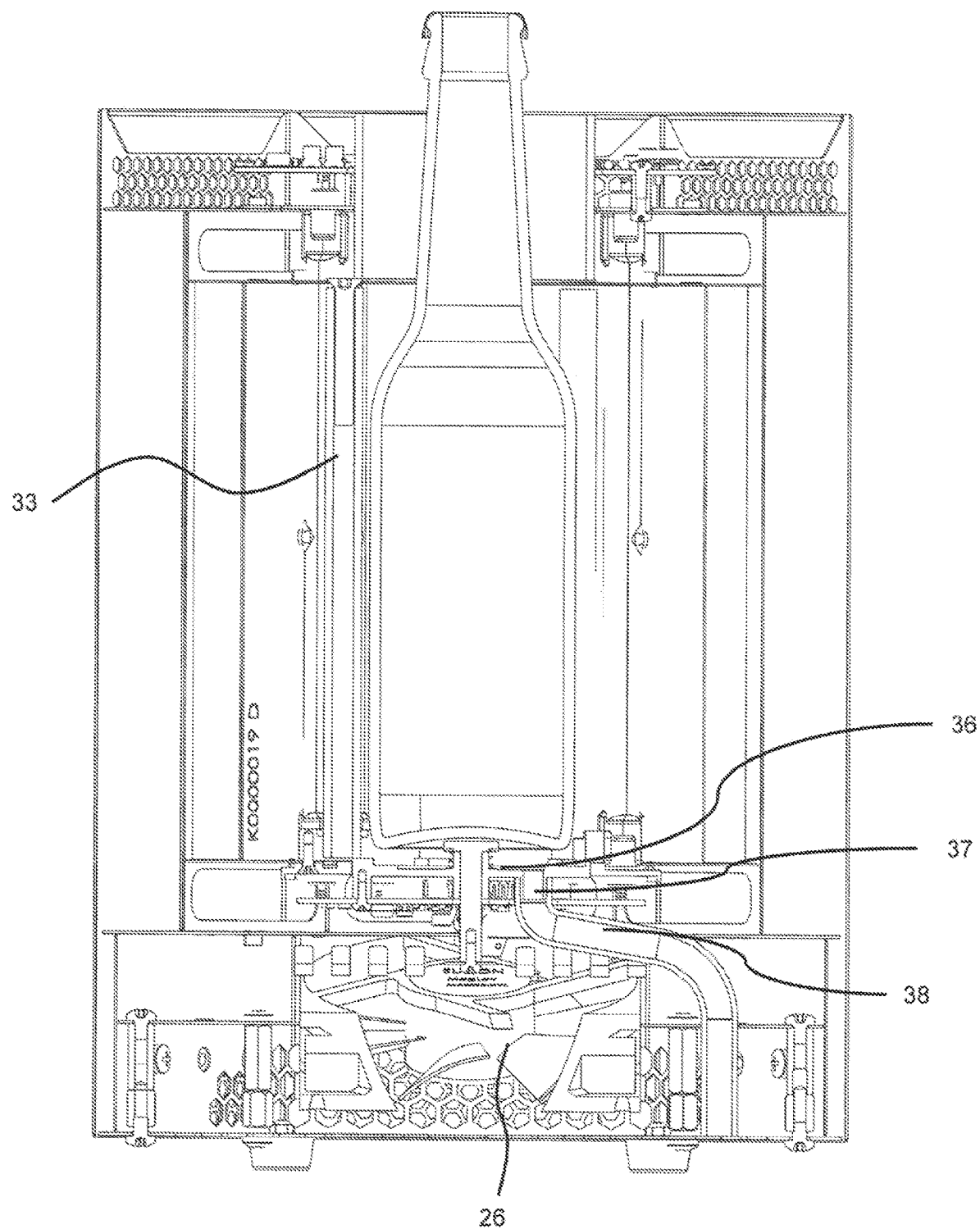
FIG. 7 shows a further schematic illustration of the apparatus from FIG. 1 in section.

In a further exemplary embodiment, the device may have a safety feature in the form of a forced disconnection of the mains cable, which makes it necessary to disconnect the mains cable when unmounting the housing 3 (FIG. 5). The cover of the housing 3 has a cutout 44, which makes it necessary to pull out the mains cable, in order to be able to remove the housing 3 in the only possible unmounting direction. The mains cable in the female connector 45 mechanically blocks the unmounting of the cover of the housing 3.

The features disclosed in the above description, the claims, and the drawing can be of significance both individually and in any combination for the implementation of different embodiments.

The invention claimed is:

1. An apparatus for thawing a frozen drink in a glass drinking bottle, having:
    a housing;
    a bottle accommodation space with a cylindrical shape, which is arranged in the housing and set up to accommodate the glass drinking bottle with the frozen drink for thawing;
    a heating device, which is arranged in the housing and has infrared heat radiators which are arranged circumferentially around the bottle accommodation space in order to radiate thermal energy onto the glass drinking bottle during thawing operation;
    an electronic circuit configured to detect whether one of the infrared heat radiators is defective;
    a thermally insulating space, which is constructed in the housing between the heat radiators and an outer housing wall and circumferentially encompassing the outer housing wall; and
    air cooling means, comprising an air intake, an air conveying device, an air duct and an air outlet, via which cooling air is drawn into the housing from the surroundings via the air intake by means of the air conveying device and conducted in the housing via the air duct to the air outlet, wherein the air duct is constructed encompassing at least the thermally insulating space.

2. The apparatus according to claim 1, wherein that the heat radiators are surrounded by an inner wall and the thermally insulating space is arranged between the inner wall and the outer housing wall.

3. The apparatus according to claim 1, wherein the thermally insulating space is filled at least to some extent with a thermally insulating material.

4. The apparatus according to claim 3, wherein the cooling air flows through the thermally insulating material during conduction along the air duct.

5. The apparatus according to claim 1, wherein the air duct is constructed encompassing electrical contact or connection regions of the heat radiators.

6. The apparatus according to claim 1, wherein the air duct is constructed encompassing a standing surface, and the standing surface is configured to support the glass drinking bottle.

7. The apparatus according to claim 1, wherein the heating device has an arrangement of bar heat radiators which are arranged around the bottle accommodation space.

8. The apparatus according to claim 1, wherein a grip protector is arranged in the housing at a housing opening, by means of which the glass drinking bottle can be introduced into the bottle accommodation space.

9. The apparatus according to claim 1, wherein the heating device couples to a control device, which is set up to control an operation of the heating device.

10. The apparatus according to claim 9, wherein a sensor device couples to the control device, which sensor device is set up to detect whether the glass drinking bottle is arranged in the bottle accommodation space.

11. The apparatus according to claim 9, wherein the control device detects that the sensor device indicates for a time period, which is shorter than a threshold time period, that no glass drinking bottle is arranged in the bottle accommodation space, and in response to detecting that the sensor device indicates for a time period that no glass drinking bottle is arranged in the bottle accommodation space, sets up to block switching on of the heating device.

12. The apparatus according to claim 9, wherein a detection device couples to the control device, which detection device is set up to determine the frozen drink in such a manner that the control device controls the heating device during operation as a function of the determining of the frozen drink.

13. The apparatus of claim 9 wherein the control device compensates with a longer heating time in response to detecting that one of the infrared heat radiators is defective.

14. A method for thawing a frozen drink in a glass drinking bottle, comprising:
provinding the apparatus according to claim 1;
arranging the glass drinking bottle in the bottle accommodation space in the housing of the apparatus; and
thawing the frozen drink in the glass drinking bottle.

* * * * *